April 7, 1942.   L. E. ENDSLEY   2,279,037
METHOD OF AND MEANS FOR CONTROLLING INTERNAL COMBUSTION ENGINES
Filed Nov. 4, 1939
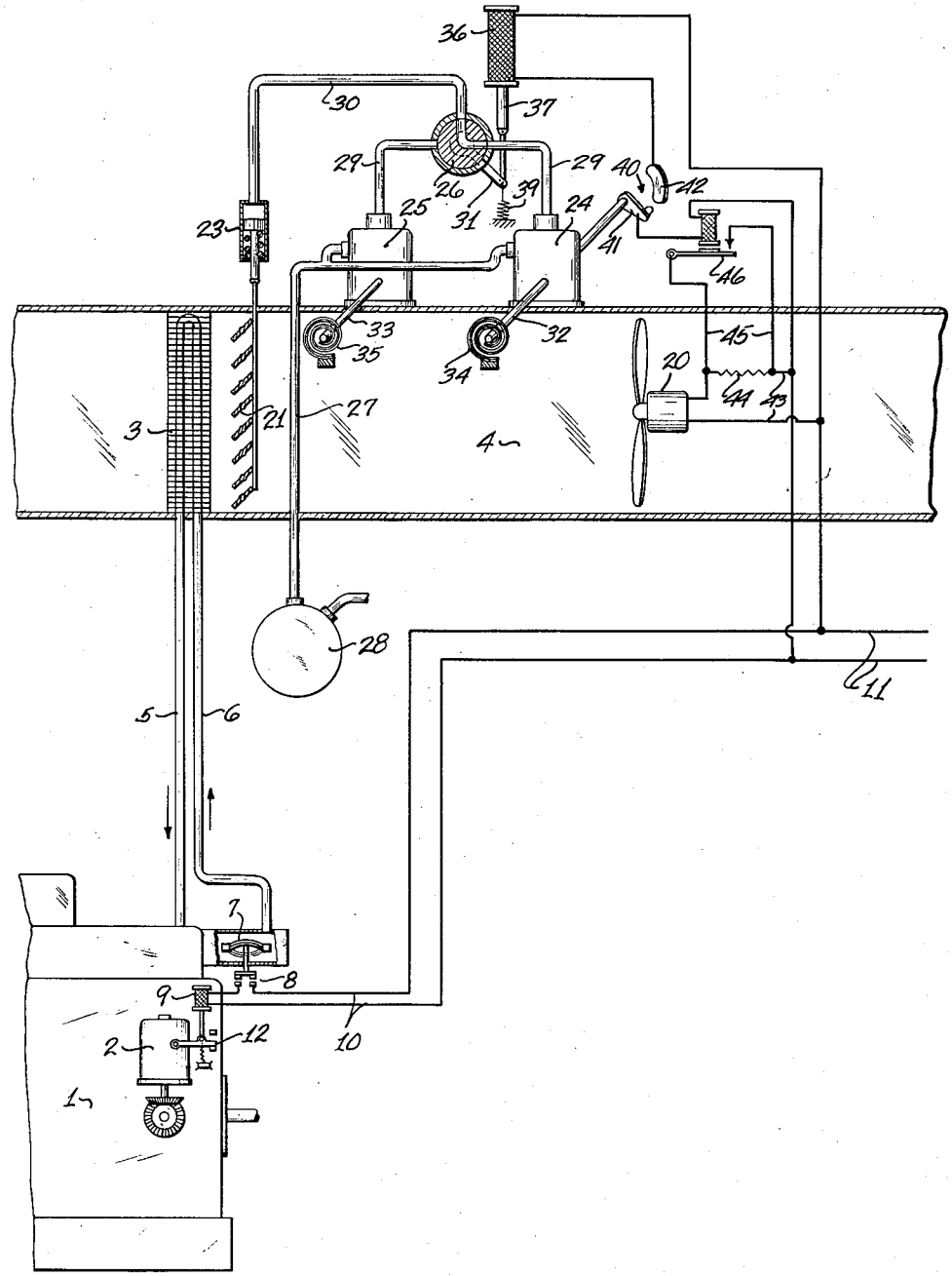
INVENTOR
LOUIS E. ENDSLEY
BY Paul L. Krober
ATTORNEY Patented Apr. 7, 1942

2,279,037

UNITED STATES PATENT OFFICE 2,279,037

METHOD OF AND MEANS FOR CONTROL-LING INTERNAL COMBUSTION ENGINES

Louis E. Endsley, Pittsburgh, Pa., assignor to Fairbanks, Morse & Co., Chicago, Ill., a corporation of Illinois Application November 4, 1939, Serial No. 302,818

15 Claims. (Cl. 123—174)

This invention relates to internal combustion engines and more particularly to improvements in methods of and means for controlling the same.

Internal combustion engines generally and especially those employed for the propulsion of railway locomotives, are frequently subjected to power demands which exceed the normal of safe load capacity of the engine. Although modern engines are capable of delivering power in excess of their full load rating for limited periods and without injury thereto, for precautionary purposes it is advantageous, and especially so in connection with Diesel powered locomotives, to impose a definite limitation on the period of overload operation. The provision of an improved control system of this character, and which functions automatically to effect a reduction in engine power following an unduly prolonged period of overloading, or the occurrence of other injurious operating conditions manifest by an abnormal rise in engine temperature, is the principal object of the present invention.

The operation of my improved system is predicated upon the well known fact that excessive loading of an internal combustion engine is accompanied by an abnormal rise in engine temperature, or the tendency of the engine to overheat. It has heretofore been proposed to provide thermostatic means, operable when subjected to a predetermined abnormal engine temperature, and through other suitable agencies, to limit or reduce the fuel supplied to the engine. Such control means do not furnish adequate protection unless additional provisions are made for regulating waste heat withdrawal from the engine, a factor which varies with and depends in large part upon the temperature of the ultimate cooling medium, in most installations the ambient air temperature. The reason for this is that when the ambient temperature is low the cooling air is capable of extracting waste heat from an engine at a greater rate, with the resulting tendency of the engine to operate at a lower temperature than is the case when the ambient temperature is high. If the protective thermostat is adjusted so that its related engine fuel control means perform as desired when the atmospheric temperature is high, the control system will not function properly when the atmospheric temperature is low, and under the latter condition the engine may be overloaded for an excessive and damaging length of time before its temperature is raised to the point required to initiate actuation of the power restricting agencies.

An object of my invention is attained in the provision of overload restricting means controlled by a thermostat in the engine cooling water, in conjunction with improved means for controlling the rate of waste heat dissipation from the cooling water and which permits the said water temperature to fluctuate within safe limits and in accordance with engine loading. Since, in order that the water temperature may be truly indicative of engine load conditions it is necessary that the rate of heat extraction therefrom be controlled and proper compensation made for changes in air temperature which effect this factor, it is an object of the invention to provide improved control means, responsive to changes in air temperature for regulating the cooling effect of the air on the engine jacket water.

More specifically, an object of the invention resides in the provision of improved means for controlling the rate of air flow through the radiator of a water-cooled engine in accordance with the temperature of the air, and involves the joint control of a fan and louvers associated with the engine radiator.

A further object is to provide for the efficient use of a fan to minimize power requirements thereof, and at the same time provide for a close and accurate regulation of the air passing through the radiator in heat exchange relation with the engine jacket water, by the co-ordinate control of fan speed and louver opening.

These and other objects and advantages will appear from the following description wherein reference is made to the accompanying drawing which illustrates, diagrammatically, an operable embodiment of my invention.

Referring now by characters of reference to the drawing, numeral 1 designates a portion of a water-cooled Diesel engine provided with a governor 2 which coacts with a fuel injection pump or pumps (not shown) to control the rate of fuel supplied to the engine cylinders in accordance with engine speed. The engine is equipped with a radiator 3 extending transversely within a conduit 4 that confines and directs a controlled stream of cooling air through the radiator 3, the radiator being connected to the engine cylinder water jacket by water pipes 5 and 6 in the formation of a closed cooling water-circulating system and which includes a suitable circulating pump (not shown). Disposed within the water circulating system and preferably located adjacent the jacket outlet port thereof, where the water temperature closely approximates the temperature of the engine cylinders, is a thermostat 7. Such thermostat is preferably of the "snap-acting" variety, well known in the art, and serves to open and close an electric switch 8 when the jacket water temperature falls and rises respectively to the end points of a definite and predetermined temperature range, to be hereinafter more fully discussed. Switch 8 controls the energization of a solenoid 9 circuited therewith by conductors 10 connected to main supply lines 11. Solenoid 9 constitutes the actuating member of an electro-magnetic control device which is shown operatively connected to a control arm 12 of the engine governor and serves, when energized, to move the control arm 12 to a position corresponding to reduced engine power. The power control arm 12, while shown as functioning in connection with a governor device, is intended to be representative of any suitable control agency that operates to reduce the power output of an internal combustion engine in any suitable manner and to a predetermined extent.

As an aid to a better understanding of the functioning of the system generally, based on actual operating temperatures and conditions, a table is hereinafter set forth, which is to be understood as merely illustrative and exemplary of conditions prevailing in a single installation under a few selected ambient temperatures.

| A | B | C | D | E | F | G |
|---|---|---|---|---|---|---|
| Ambient air temperature | Full load H₂O temperature | Overload shutdown H₂O temperature | H₂O temp. rise above full load H₂O temp. to effect shutdown (C—B) | (B—A) | $\frac{D}{E}$ | Airflow cu. ft. min. |
| Degrees | Degrees | Degrees | Degrees | Degrees | Per cent | |
| 110 | 156 | 163 | 7 | 46 | 15.2 | 50,000 |
| 90 | 153 | 163 | 10 | 63 | 15.8 | 36,500 |
| 70 | 150 | 163 | 13 | 80 | 16.2 | 28,200 |
| 50 | 147 | 163 | 16 | 97 | 16.5 | 23,700 |
| 30 | 144 | 163 | 19 | 114 | 16.6 | 20,000 |

In the table, the figures in column A represent, in degrees Fahrenheit, a range of five different temperatures between and including 30° and 110° F., representing ambient air temperatures within the range ordinarily encountered in certain climates. Column B represents, in a given engine, the normally prevailing full load temperature of cooling fluid such as water, the different values corresponding approximately to the different ambient air temperatures of column A. It will be understood that the full load engine water temperature, values of which are given in column B, may be effectively controlled and determined by suitably designing the cooling system for example, its water capacity, and regulation of the rate of air flow through the radiator in accordance with ambient temperatures, as by means to be hereinafter described. In the tabulated example the water temperature at full load is 156° F., when the ambient temperature is 110°, and 144° when the ambient temperature drops to 30°. Should the loading on the engine be increased, its temperature and that of the jacket water will rise to a critical value as given in column C, 163° F. in the present example, which corresponds to a predetermined overload shutdown or load modifying temperature, by which is meant a transition temperature at and beyond which the engine fuel supply rate is reduced as through thermostat 7 which functions in connection with the engine governor, for example. It will be understood that a reduction in engine power, as aforesaid, is accompanied by a gradual drop in engine temperature. Thermostat 7 is so constructed and adjusted however, to maintain its dominating or load modifying influence on the governor until the water temperature drops to a definite value, say 144° F., and accordingly prevents the engine from re-assuming an overload burden until engine temperature has first been restored to a safe operating value.

In the table given by way of example, the series of values given in column D represents varying temperature differentials corresponding respectively to differences in corresponding values of column C and column B. The figures in column D accordingly represent the permissible temperature rise above full load water temperatures (column B) until the engine load is reduced upon the attainment of the water temperature value, or thermostat actuating temperature in column C. Similarly, the series of values in column E represent the differences, respectively, between the corresponding figures in column B and those in column A, namely, the temperature differential between full load temperature of the jacket water and the ambient air temperature. Column F of the given example consists of a series of percentage ratios represented by D/E. It will appear from examination of the relatively confined range of the percentage ratios of column F, that this ratio is substantially constant within the range of ambient temperatures selected for tabulation, viz., 30° to 110°. Column G is illustrative, in the application of the method to a given cooling system of different values, each representative of a flow of air through the radiator, expressed in cubic feet per minute. It will be noted that this flow of air is substantially reduced from the value applicable, say under 110° ambient temperature, to the value prevailing under, say freezing ambient temperature or lower. The method of regulation contemplated by the present invention thus involves a volume control of cooling air flow in accordance with varying ambient temperatures, and results, under thermostat settings providing the overload or load reduction temperatures of column C, in a ratio of approximately one-sixth, i. e., the ratio between the values in column D and those in column E.

From the foregoing it will have appeared as a desideratum that the increase in water temperature between normal full load operating temperature and engine load-reduction temperature, shall be a substantially constant proportion or fraction of the value representing the temperature differential between that of the ambient air, and that of the water under normal full load conditions. For purposes of further description and certain of the claims, the foregoing may be stated in reference to the tabulation above as one example of operating conditions, that C—B/B—A shall be a substantially constant percentage or ratio, within a wide range of ambient temperatures, and that this condition is assured and maintained in substantial part, by regulation of volume of air per unit time passed through the radiating elements of the engine cooling fluid system.

The drawing illustrates, by way of example, control agencies for regulating the volume of air traversing radiator 3 in accordance with air temperature, which involve coordinated control of air displacement means, such as an electric motor-driven fan 20, and of a set of adjustable louvers 21 located adjacent the radiator. As will be hereinafter more fully explained, fan 20 has several distinct operating speeds, each corresponding to a predetermined range of ambient temperature, while louvers 21 are adapted to modulate air flow through the radiator in accordance with changes in ambient temperature in each of the said temperature ranges. Thus, in the present example it is contemplated that fan 20 shall have two operating speeds and be so controlled by a thermostat responsive to ambient air temperature that it operates at a constant, relatively low speed when the air temperature, for example, is at or below 80° F., and at a constant, relatively high speed when the ambient temperature rises above that value. The louvers 21 are adapted, under thermostatic control, to move from an almost closed condition to full open condition as the air temperature rises from the lowest point ordinarily encountered in the region in which the engine is operating, to the fan speed transition point, in the present example given as 80° F. At the said transition temperature the fan speed increases to its constant, high speed value and the louvers move abruptly to a partly closed condition, whereby to restrict the flow of air through the radiator to prevent a disproportionate cooling effect which would otherwise obtain due to the higher fan speed. With rising ambient temperature in the high temperature range, upward of 80° F., the louvers gradually open until they obtain full open condition at the highest ambient temperature normally encountered by the engine.

The foregoing results may be accomplished in a number of different ways, the one selected for illustration in the present disclosure involving fluid pressure means for actuating the louvers 21, operating coordinately with an electrical fan speed regulator.

The fluid pressure means aforesaid include a servo-motor 23 of cylinder and piston type, operatively connected through suitable linkage to the louvers 21, the extent of piston displacement and hence louver opening being proportional to the pressure of the fluid in the cylinder. The fluid pressure acting on the piston is balanced by a spring, the two oppositely directed forces thus produced tending to hold the piston and louvers in a definite position as determined by the magnitude of the fluid pressure, the said spring effecting closing movement of the louvers when the fluid pressure is reduced. As a means for regulating the fluid pressure aforesaid, there are provided two pressure control devices 24 and 25 which are adapted individually and consecutively to be connected to the cylinder of the louver servo-motor 23 by means of a two-way valve 26. Where air under pressure is employed as the motivating fluid, the devices 24 and 25 may be constituted by so-called self-lapping valves, well known in the art and commonly employed in connection with the brake systems of railway cars. In its commercial form presently available to the trade, the self-lapping valve device includes a control shaft which, when turned a certain angular extent from an initial or limited position, effects an adjustment of internal valve mechanism that functions automatically to lap off the flow of air to a chamber in fluid communication with the device when the pressure in such chamber builds up to a value corresponding to the extent of shaft displacement from its said initial position. A detailed description of a self-lapping valve assembly of a character suitable for use in the control system of the present invention may be found in Bulletin No. 2455 of April 1932, published by Westinghouse Traction Brake Co. of Pittsburgh, Pa.

In the present example the pressure control valves 24 and 25 have their inlet ports connected by piping 27 to a source of air under pressure, such as the reservoir tank 28, and their outlet ports connected by piping 29 to the two-way valve 26. Valve 26 is connected by piping 30 to the cylinder of servo motor 23 and operates to place either one of the control valves 24 or 25 in fluid communication with the servo-motor, depending upon the position of valve arm 31 which is operated by a solenoid as will hereinafter be explained. The rotatable control shafts of the valve units 24 and 25 are designated 32 and 33 respectively, and rotation of these shafts is effected by spiral or torsional thermostats 34 and 35 operatively connected thereto and disposed in conduit 4 so as to respond to changes in the temperature of the cooling air. As has been previously mentioned, each of the control devices 24 and 25 are adapted to effect a variation of air pressure in the cylinder of servo-motor 23 through a range sufficient to move the louvers from minimum to maximum open position. However, the thermostats 34 and 35 have different design constants in that thermostat 34 is adapted to turn its associated shaft 32 through its full range of movement when the air temperature varies, say, from 0° to 79° F., while thermostat 35 does not become effective until the air temperature reaches 80° F., and operates in a range from 80° F. to say, 110° F. to effect full variation of the louvers, through pressure control device 25.

In the accompanying drawing, two-way valve 26 is shown as conditioned to place pressure control device 24 in controlling relation with servo motor 23, such relationship existing when the ambient temperature is below the transitional value, in the present example, 80°. As a means for reversing the valve 26 to transfer control of servo-motor 23 to pressure control device 25, there is provided a solenoid 36 whose magnetic plunger 37 is connected to the actuating arm 31 of valve 26, such arm being constrained by a spring 39 to its shown position when solenoid 36 is de-energized. Energization of solenoid 36 to reverse valve 26 is under the control of a switch 40, the movable contact 41 of which is mounted on shaft 32 of pressure control device 24. Movable contact 41 is arranged to engage stationary contact 42 when shaft 32 is turned by its actuating thermostat 34 to a position corresponding to air temperature of 80°, and the contacts remain in mutual engagement for air temperature values above this figure.

Switch 40 also serves to change fan 20 from low to high speed operation. Thus, there is shown provided in the fan energy supply circuit 43, a resistance unit 44 and a shunt or by-pass circuit 45 for the said resistance unit. Switch 40, acting through a relay 46, operates to close the resistance by-pass circuit when the air temperature is at 80° or above whereby to effect high speed operation of the fan.

The principal advantage of the above described coordinated control of fan speed and louver opening is to obtain a closer and more accurate regulation of air flow through the radiator than is possible by the use of either of these air controlling agencies acting alone. However, an additional and important benefit from the described air flow control system obtains by reason of the conservative use of energy for driving the fan, the same being operated at a relatively slow speed when engine cooling requirements are low.

From the foregoing description it will be understood that my improved control system includes thermostatic means responsive to engine jacket water temperatures for reducing the power output of an engine when its jacket temperature attains a definite predetermined value, together with means for controlling heat dissipation from the jacket water to the air so that the jacket water temperature will vary in accordance with a predetermined scale, in response to changes in engine loading. The provisions set forth herein are especially desirable when employed in connection with Diesel powered locomotives to prevent undue or excessively long periods of overloading, because variations in temperature of the ultimate cooling medium, the ambient air temperature, to which a locomotive engine may be subjected, do not adversely influence or upset the scalar relationship between engine loading and jacket water temperature. Accordingly the jacket water temperature will provide an accurate index of engine loading for all conditions of ambient air temperature and may be safely employed as the determining factor for load limiting agencies.

While I have shown and described means of particular type for controlling the flow of air effective to cool the radiator, such means including staged variation of fan speed with full variation of louver opening in each stage, it will be understood that any suitable means for proportioning the rate of air flow through the radiator in accordance with temperature or for proportioning the water flow rate through the radiator in accordance with air temperature, so as to obtain a controlled cooling effect on the jacket water, may be employed. Moreover, whereas the engine jacket water has been specified herein as an agency in the control system, it will be understood that the lubricating oil may be used in its stead in engines that utilize the lubricating oil as a cooling agency and are provided with an oil cooling radiator.

Having described my invention, what I claim is:

1. The combination with an internal combustion engine including a liquid cooling system, of control means for regulating time of overload operation, and including thermostatic means responsive to temperature of the liquid cooling medium, engine load regulating means in influenced relation to the thermostatic means, means controlling displacement of air through a radiating element of the engine cooling system, and a second thermostatic means of modulating type, responsive to ambient air temperature, and in controlling relation to said air displacement means, both of said thermostatic means being so regulated and coacting as to effect a protracted but limited time of engine operation under overload conditions.

2. In combination with an internal combustion engine including a liquid cooling system and a radiating unit therein, a vane-type control device for regulating air flow traversing said unit, and a modulating thermostat, thermally subject to ambient air temperatures, and arranged to effect substantially a full range of control movement of the vane elements of said control device, in each of a plurality of ranges of ambient temperatures.

3. In combination with an internal combustion engine, a liquid cooling system including a radiator, a multi-speed displacement device for impelling air through the radiator, and thermostatic means, thermally subject to ambient air temperatures and arranged to vary the speed of the displacement device as separate ranges of ambient temperature are encountered.

4. In combination with an internal combustion engine, a liquid cooling system including radiator, a multi-speed displacement device for impelling air through the radiator, and thermostatic means, thermally subject to ambient air temperatures and arranged to vary the speed of the displacement device as separate substantial ranges of ambient temperature are encountered, and a separate air flow control device influenced by said thermostatic means, for effecting substantially a full range of air flow regulation, within each said range of ambient temperature.

5. In combination with an internal combustion engine provided with a liquid cooling system and radiator therein, a governor in speed and load regulating relation to the engine, a thermostat which is thermally subjected to the liquid cooling medium in said system and operable in regulating relation on the governor, responsively to predetermined cooling medium temperatures, a cooling air flow control assembly including a modulating thermostat subject to outside temperatures, said thermostats being so related in setting or adjustment as to restrict the time of overload operation of the engine.

6. The described method of regulating the load and cooling conditions of an engine equipped with a liquid cooling system and radiator, which consists in varying the displacement of an air impelling agency coacting with the radiator, as the engine encounters differing ranges or orders of ambient temperature, and in modulating the flow of air traversing the radiator, in accordance with changes in ambient temperature within each of said temperature ranges.

7. The described method of regulating the load of an internal combustion engine, equipped with a liquid cooling system and radiator, and of cooling the engine by successive step or stages, which consists in varying the displacement of an air displacing device coacting with the radiator, as the engine encounters distinct and differing orders or ranges of ambient temperature, and in further modulating the flow of air traversing the radiator, in accordance with minor changes in ambient temperature within each of said distinct temperature ranges, the last said modulation of air flow extending from a substantially restricted air flow to the then available full flow of air, within each of said temperature ranges.

8. The described method of regulating the load of an internal combustion engine, equipped with a liquid cooling system and radiator, and of cooling the engine by successive steps or stages, which consists in varying the displacement of an air displacing device coacting with the radiator, as the engine encounters distinct and differing orders or ranges of ambient temperature, and in further modulating the flow of air traversing the radiator, in accordance with minor changes in ambient temperature within each of said distinct temperature ranges, the last said modulation of air flow extending from a substantially restricted air flow to the then available full flow of air, within each of said temperature ranges, and in each said ranges of ambient temperature, further controlling the engine temperature by restricting the time of engine operation under overload conditions.

9. The herein described method of controlling duration of internal combustion engine operation under overload conditions, which consists in reducing engine speed setting responsively to attainment of a predetermined temperature in the engine cooling medium, and in so varying the rate of thermal transfer from said medium in accordance with changes in ambient temperature, as to maintain a substantially constant ratio between a value representing the difference between full load operating temperature of the engine cooling medium, and said predetermined temperature, and a value representing the difference between ambient air temperature and said full load operating temperature.

10. The described method of operating an internal combustion engine under varying load conditions and differing ambient temperature conditions, which consists in limiting the periods of engine operation under overload by controlling the rate of flow of an ultimate cooling medium, and thereby keeping constant within reasonable limits, the ratio $C-B/B-A$, wherein A represents the then prevailing ambient temperature, B represents a full load water temperature normally prevailing at the then ambient, and C a predetermined cooling medium temperature above A and B, and beyond which continued engine operation is hazardous.

11. The herein described method of operating an internal combustion engine of liquid cooled type, under varying load conditions and ambient temperatures, which consists in limiting the periods of engine operation under overload, by controlling the rate of flow of a stream of air in heat exchange relation to the engine cooling liquid, and thereby maintaining within a limited range, the ratio $D/F$, wherein D represents the difference between a cooling liquid temperature requiring engine load modulation, and a cooling liquid temperature corresponding to full load operation at the then prevailing ambient temperature, and wherein F represents the difference between the last said full load operating liquid temperature and the ambient air temperature, said control of rate of flow of cooling air, consisting of a reduction of volume of air flow per unit time, responsively to a reduction in ambient temperature.

12. The herein described method of operating an internal combustion engine of liquid cooled type, under varying load conditions and ambient temperatures, which consists in limiting the periods of engine operation under overload, by controlling the rate of flow of a stream of air in heat exchange relation to the engine cooling liquid, and thereby maintaining within a limited range, the ratio $D/F$, wherein D represents the difference between a cooling liquid temperature requiring engine load modulation, and a cooling liquid temperature corresponding to full load operation at the then prevailing ambient temperature, and wherein F represents the difference between the last said full load operating liquid temperature and the ambient air temperature, said control of rate of flow of cooling air, consisting of a reduction of volume of air flow per unit time, responsively to a reduction in ambient temperature, and upon attainment of the temperature of cooling liquid under overload conditions beyond which temperature engine operation is hazardous, modulating the engine loading until the last said temperature is reduced to a safe value for continued engine operation throughout its permissive load range.

13. The herein described method of restricting a period of operation of an internal combustion engine under overload conditions, the engine being of a type provided with a liquid cooling system including a radiator, and further provided with governing means capable of regulation to provide for engine operation in different speed ranges, the method including the step of controlling the rate of flow of radiator-cooling air, increasing such flow in response to increase in ambient temperature ranges encountered by the engine, and in a manner to maintain substantially constant, the ratio $C-B/B-A$ as such ratio is defined in claim 15 above, and upon operating the engine under existing ambient temperatures for a period of time such that its cooling liquid attains the temperature C, changing the regulation of the engine governor for such a length of time as will enable the temperature of the liquid engine cooling medium to be reduced to safe values.

14. In combination with a water-cooled internal combustion engine including a radiator for transferring waste engine heat from the engine jacket water to a stream of air traversing said radiator, the jacket water and the air stream constituting interdependent media for cooling the engine, a thermostat responsive to temperature of the cooling air, means associated with said radiator, in influenced relation to said thermostat, for varying the flow of one of said cooling media through the radiator in proportion corresponding to variations in the temperature of the cooling air, a second thermostat responsive to temperature of the jacket water, and means in influenced relation to said second thermostat for reducing the rate of fuel supply to the engine when the temperature of the jacket water attains a predetermined value.

15. In combination with an internal combustion engine including a liquid cooling system, a thermostat responsive to temperature of the liquid cooling medium, engine fuel regulating means in influenced relation to said thermostat, adapted to effect a reduction in engine power output upon the attainment of a predetermined temperature value of the liquid cooling medium, a heat exchanger in said liquid cooling system for transferring heat from the liquid medium to an ultimate cooling fluid, a second thermostat responsive to temperature of the ultimate cooling fluid, and means in influenced relation to said second thermostat for regulating the rate of heat transfer from said liquid medium to said ultimate cooling fluid.

LOUIS E. ENDSLEY.